May 21, 1968 N. BLOEMBERGEN 3,384,433
APPARATUS FOR CONVERTING LIGHT ENERGY FROM
ONE FREQUENCY TO ANOTHER
Filed July 9, 1962 2 Sheets-Sheet 1
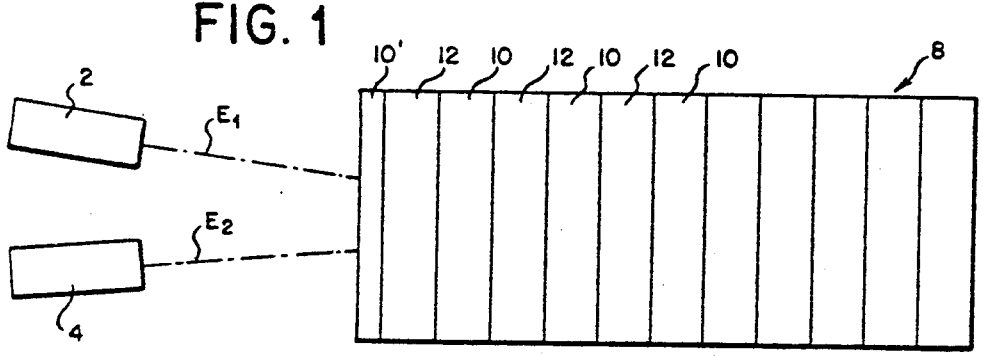
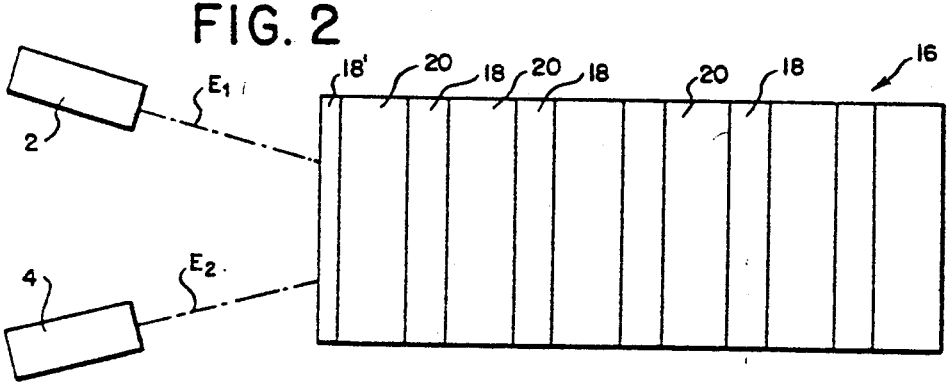
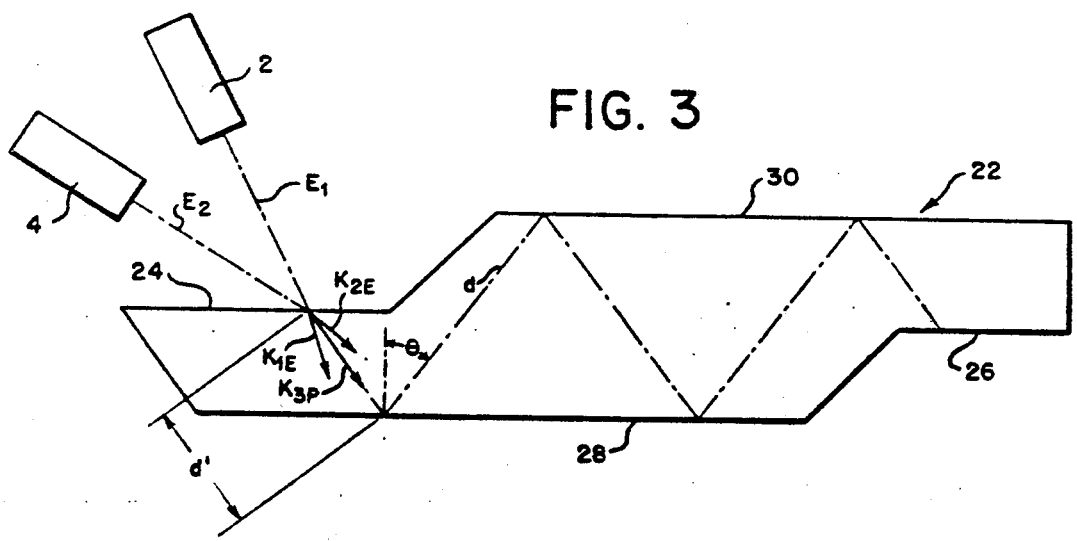
INVENTOR
Nicolaas Bloembergen
BY
ATTORNEYS May 21, 1968 N. BLOEMBERGEN 3,384,433
APPARATUS FOR CONVERTING LIGHT ENERGY FROM
ONE FREQUENCY TO ANOTHER
Filed July 9, 1962 2 Sheets-Sheet 1
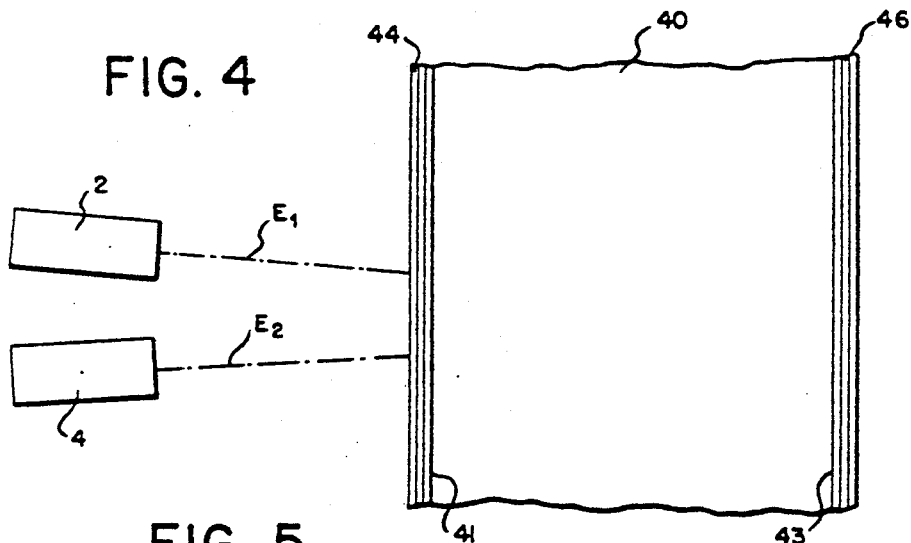
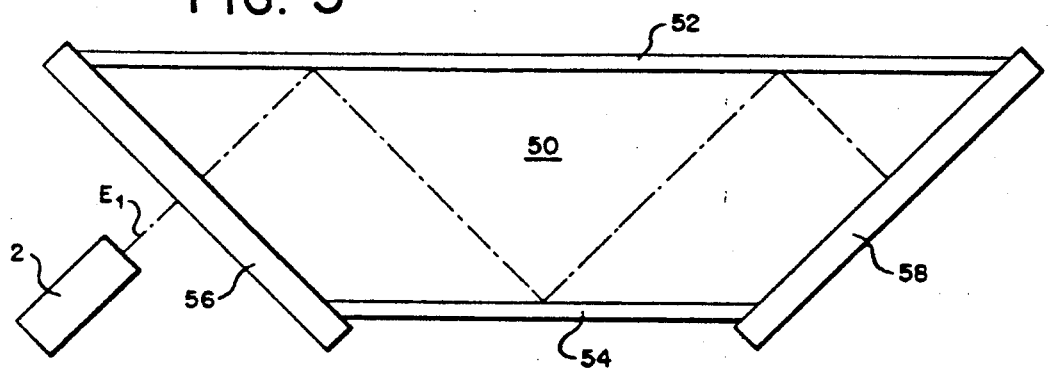
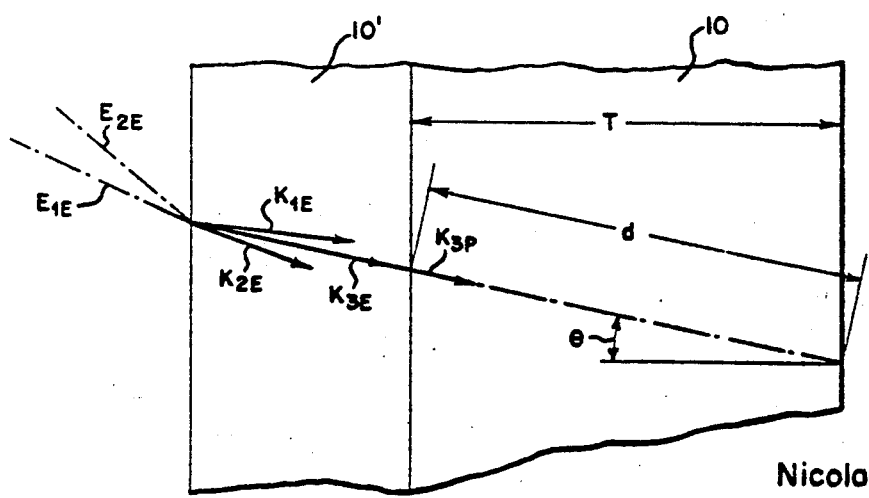
INVENTOR
Nicolaas Bloembergen
BY
ATTORNEYS

United States Patent Office 3,384,433
Patented May 21, 1968

3,384,433
APPARATUS FOR CONVERTING LIGHT ENERGY FROM ONE FREQUENCY TO ANOTHER
Nicolaas Bloembergen, Lexington, Mass. (% Cruft Laboratory, Harvard University, Cambridge, Mass. 02138)
Filed July 9, 1962, Ser. No. 208,551
8 Claims. (Cl. 350—150)

The present invention relates to non-linear optical devices and provides a method and apparatus for maintaining a desired phase relation between a polarization wave and a corresponding electromagnetic wave of the same frequency in an optically non-linear medium.

When light waves pass through a dielectric, the alternating electric field associated with those waves polarizes the dielectric. If the electric field associated with a beam of light waves is identified by the vector quantity $\vec{E}$, the polarization produced thereby in a dielectric medium is describable by the vector quantity $\vec{P}$, which is related to $\vec{E}$ by the equation $\vec{P}=K\vec{E}$, wherein $K$ is the dielectric tensor of the medium. For light of the intensities encountered in everyday experience $K$ is for all practical purposes composed of constant terms, independent of the value of E. In fact however, the relation between polarization and electromagnetic wave amplitude is not truly linear, and includes higher powered terms of $\vec{E}$. For highly intense light beams such as the coherent beams produced by optical masers (hereinafter called lasers), these higher powered terms, and particularly the terms in the second, third or other low powers of $\vec{E}$, become non-negligible. In consequence of this fact, with suitably selected dielectrics and sufficiently intense light waves E, the polarization P induced in the dielectric includes a significant second or other higher harmonic component. Under such circumstances the dielectric is said to be non-linear. If the dielectric is illuminated in the same region thereof with two such intense beams of different frequencies, the induced polarization will include components at their sum and difference frequencies. The case of second harmonic generation may be viewed as a special case of that involving two intersecting beams of unlike frequency, in which however the two beams are brought into coincidence of position and frequency.

The second harmonic sum (or difference) frequency component (hereinafter called the third frequency) of the polarization may under certain circumstances give rise to an electromagnetic (i.e., light) wave in the dielectric. Whether and to what extent this light wave at the third frequency will grow in amplitude to significant levels depends on the phase relations between it and the polarization wave of that sum or difference frequency. Desirably, for build-up of the third frequency electromagnetic wave, that wave and the third frequency component of the polarization should everywhere be in a fixed relative phase, ideally in quadrature, with the polarization component leading. The travelling electromagnetic wave at the third frequency and the travelling polarization wave at the third frequency should therefore, at least ideally, have the same phase velocity in the dielectric, which is equivalent to saying that they should have the same wave number vectors, since their temporal frequencies are equal.

If the third frequency is the sum frequency, the sum frequency component of the polarization wave can be shown to have a spatial variation in the dielectric characterized by a wave number vector $\overrightarrow{K_{3P}}$ which is the vector sum of the wave number vectors $\overrightarrow{K_{1E}}$ and $\overrightarrow{K_{2E}}$ of the incident electromagnetic (hereinafter E.M.) waves $\vec{E}_1$ and $\vec{E}_2$ of frequencies $f_1$ and $f_2$. The E.M. wave at the sum frequency is however characterized by a wave number vector which depends strictly on the index of refraction of the dielectric at the sum frequency. Since except in regions of anomalous dispersion the index of refraction of the dielectric increases with frequency, the wave number vector of the E.M. wave at the sum frequency will in nearly every case be greater, in absolute value, than the sum of the absolute values of the wave number vectors of the incident E.M. waves $\vec{E}_1$ and $\vec{E}_2$. Hence it is clear that the wave number vector of the sum frequency E.M. wave must be longer than, and hence cannot coincide with the wave number vector of the sum frequency polarization wave. The phase velocity of the sum frequency polarization wave will be greater than that of the sum frequency E.M. wave, the two will get out of step, and build-up of the sum frequency E.M. wave is prevented.

If the third frequency is to be the difference or a higher harmonic or combination frequency, then the wave number vector, $\overrightarrow{K_{3P}}$, of the third frequency polarization wave can be determined as the vector difference or the corresponding linear combination of wave number vectors of the incident electromagnetic waves. For example, even in the case of a combination of three waves at frequencies $f_1$, $f_2$ and $f_4$ to form $f_3$, if $f_3 = f_1 + f_2 - f_4$ then $$\overrightarrow{K_{3P}} = \overrightarrow{K_{1E}} + \overrightarrow{K_{2E}} - \overrightarrow{K_{4E}}$$

The foregoing discussion has assumed the dielectric to be optically isotropic. It has been proposed heretofore to employ the well-known differences in index of refraction between ordinary and extraordinary rays in a birefringent dielectric material in order to effect, by careful selection of the directions of propagation and planes of polarization of the $\vec{E}_1$ and $\vec{E}_2$ waves through the dielectric, such wave number vectors for $\vec{E}_1$ and $\vec{E}_2$ in the material that their vector sum (which characterizes the sum frequency polarization wave) is equal to the wave number vector of the sum frequency E.M. wave. In this manner it has been possible to effect a match of the two phase velocities of interest, and to obtain a significant conversion of energy from the incident E.M. waves of frequency $f_1$ and $f_2$ to the E.M. wave of frequency $f_1+f_2$.

Such arrangements are however highly critical with respect to the angular orientation of the light sources with respect to the dielectric. Further, they limit the choice of material to one which is strongly birefringent. The present invention proposes instead to achive a cumulative build-up in the amplitude of the sum frequency E.M. wave by periodically shifting or correcting the relative phase of the third frequency polarization and E.M. waves.

The invention will now be described in further detail by reference to the accompanying drawings in which:

FIGS. 1 to 5 are diagrams illustrating separate embodiments of my invention, and FIG. 6 is a diagram useful in explaining the operation of the embodiment of FIG. 1.

The embodiment of FIG. 1 is useful when it is desired to generate the simple sum or difference frequency of two incident E.M. waves, employing the square-law term in the relation $\vec{P}=K\vec{E}$ in the polarization of a non-centrosymmetric dielectric.

Referring to FIG. 1, two lasers are indicated diagrammatically at 2 and 4. These devices are now well-known, being described for example by T. H. Maiman at Phys. Rev. 123, 1961. A description of the nature and construction of the lasers 2 and 4 is therefore not given here. They produce separate beams $\vec{E}_1$ and $\vec{E}_2$ of high intensity, coherent light at separate frequencies $f_1$ and $f_2$.

The beams $\vec{E}_1$ and $\vec{E}_2$ are in general but need not be oblique to each other, and pass through a common region of a dielectric mass generally indicated at 8. The mass 8 is composed of a plurality of slabs or lamellae 10 and 12 which alternate with each other. The slabs may be considered as being seen in plan in FIG. 1. All of the slabs 10 and 12 may be made of the same material, which must be transparent to light of the frequencies $f_1$, $f_2$ and $f_1+f_2$ or $f_1-f_2$. The fact that $f_3$ is a simple sum or simple difference of $f_1$ and $f_2$ entails the requirement that the material be non-centro-symmetric (hereinafter abbreviated as N.C.S.). The material is preferably cubic in crystal lattice. It is also preferably to a first order optically isotropic, but need not necessarily be thus isotropic, and any of the arrangements disclosed here for isotropic materials will also be operative with birefringent materials. Zinc sulfide is a suitable material for light beams $\overrightarrow{E_1}$ and $\overrightarrow{E_2}$ in the visible range. Except for a first slab 10' which is advantageously made substantially half as thick as the others, the slabs mayy all be of the same thickness, and are advantageously made in the form of plane parallel plates, as indicated in the figure.

The slabs 12 differ from the slabs 10 (and the slab 10') between which they are intercalated in that they are, in respect of crystal symmetry, the inversion image of the slabs 10 and 10'.

All materials which are naturally of N.C.S. type exist in two species each of which is the inversion image of the other. In the case of optically active materials such as quartz or sodium chlorate, the two forms are readily identifiable by their dextrorotatory and levorotatory properties. In materials such as zinc sulfide, the two forms may be distinguished on the basis of X-ray diffraction and piezo-electric tests as described for example in the article of C. S. Smith, entitled "Symmetry and Properties," in volume 6 of Solid State Physics, edited by F. Seitz and D. Turnbull.

Thus in FIG. 1 the slabs 12, to be inversion images of slabs 10, must be composed of the opposite species of N.C.S. material, and oriented so that their crystallographic axes are parallel to those of slabs 10 and 10'.

In contrast to N.C.S. materials, a C.S. material is one in which, when its crystal unit cell is inverted through a point called the center of symmetry of the unit cell, the unit cell so inverted is identical with its former self.

The directions and planes of polarization of the incident light beams from lasers 2 and 4 with respect to this crystallographic orientation are chosen in such a manner that in the dielectric mass 8 the component of the polarization at the third frequency perpendicular to the direction of propagation of the E.M. wave at the third frequency is *not* zero, and preferably is as large as possible.

For example in ZnS both incident beams may propagate along the 111 direction and be polarized along the 110 direction. The polarization wave $P_3$ at the third frequency will be polarized along the 001 direction, which has a component perpendicular to the direction of the third wave along 111, thus satisfying this condition. See Office of Naval Research Contract No. 1866 (32) NR-371-016, Technical Report on Interactions Between Light Waves in a Non-Linear Dielectric, by J. A. Armstrong, N. Bloembergen (the applicant) and others of Mar. 20, 1962, constituting Technical Report No. 358 of Cruft Laboratory, Harvard University, Cambridge, Mass., to be published in the Physical Review.

The slabs 10 and 12 are so dimensioned, with respect to the frequencies involved and the directions of propagation of the waves therethrough, that the polarization and E.M. waves at the third frequency undergo in the traversal of each slab phase changes which differ by $n\pm\frac{1}{2}$ cycles, $n$ being an integer. With the exception preferably of the first slab 10', the slabs may all be of the same thickness but need not be, and the direction of propagation of the third frequency polarization and E.M. waves may but need not be normal to the interfaces between the slabs. In general it will not be so normal.

Depending upon the angles of incidence of the beam $E_1$ and $E_2$ on the outermost face, the thickness of the slabs is selected to hold the difference in phase change between the polarization and E.M. waves at the third frequency to the desired value of $n\pm\frac{1}{2}$ cycles. The relationships are indicated in the sketch of FIG. 6 which shows to an enlarged scale the first slab 10'. FIG. 6 has been drawn on the assumption that the third frequency $f_3$ is the sum of the incident wave frequencies $f_1$ and $f_2$. In FIG. 6 the light beams $E_1$ and $E_2$ are shown incident on the slab from the left at unlike angles of incidence. After refraction at the exterior surface of the slab, they progress through the slab in directions and with spatial frequencies identified by the wave number vectors $\overrightarrow{K_{1E}}$ and $\overrightarrow{K_{2E}}$ respectively.

The vector $\overrightarrow{K_{3P}}$, which is the sum of vectors $\overrightarrow{K_{1E}}$ and $\overrightarrow{K_{2E}}$, identifies the direction and spatial frequency of the polarization wave $P_3$ at the sum frequency $f_1+f_2$. This polarization wave is incident at an angle on the interface bounding slab 10' on the right. The sum frequency E.M. wave $F_3$ generated by $P_3$ is identified in FIG. 6 by means of its wave number vector $K_{3E}$ which is parallel to the vector $\overrightarrow{K_{3P}}$ but which has typically a different length. $K_{3E}$ is given by the equation $K_{3E}=(f_1+f_2)n_{(f_1+f_2)}/c$, wherein $n_{(f_1+f_2)}$ is the index of slab 10' at the sum frequency and $c$ is the velocity of light in free space.

The wave $P_3$ gives rise to and amplifies an E.M. wave $E_3$ at the third frequency as long as it is leading this wave in phase. E.M. waves of spontaneous origin having such frequency and direction that, when overrun by the wave $P_3$, they possess the proper phase relation with respect to $P_3$, will absorb energy from $P_3$, while others may surrender energy to $P_3$ or be unaffected by it. The proper phase relation is that in which $P_3$ leads the E.M. wave or waves to be amplified by an angle of from 0° to 180°, with maximum transfer of energy from $P_3$ when the lead is 90°. Waves which absorb energy from $P_3$ are effectively amplified, and there occurs a cumulative build-up, by a geometric progression, of an E.M. wave $E_3$ at the sum frequency, the energy for which is derived from $P_3$ and ultimately from $E_1$ and $E_2$. In consequence, in general, $P_3$ and $E_3$ start out at the entering face of slab 10' with $P_3$ leading $E_3$ by a quarter of a cycle. The build-up, once started, continues as long as the $P_3$ leads $E_3$. For effective interaction between them, $P_3$ and $E_3$ must be travelling in the same direction; their wave number vectors can therefore be considered to be collinear. The two waves $P_3$ and $E_3$ thus progress collinearly but typically at unlike phase velocities, as already explained. Their relative phase thus changes as they propagate through the dielectric. When the phase difference between them has changed to such an extent that $E_3$ leads $P_3$ instead of lagging it, the direction of energy transfer is reversed. In accordance with the invention, the phase relation between $E_3$ and $P_3$ is changed, preferably repeatedly and indeed periodically, and preferably by 180°, so as to forestall the decline in amplitude of $E_3$. In the embodiment of FIG. 1, this change is effected by alternation of the slabs 10 and 12. This construction has the effect of reversing the phase of $P_3$ at each interface between a pair of adjacent slabs 10 and 12, leaving the other waves $E_1$, $E_2$ and $E_3$ of interest entirely unaffected. The thickness of the slab 10' is selected so that, in view of the angles of incidence of beams $E_1$ and $E_2$ from the lasers on the first slab 10, the difference in phase change undergone by $P_3$ and $E_3$ within that slab is equal or substantially equal to $n\pm\frac{1}{4}$ cycles, with $n$ an integer. $n$ may be zero, unless the resultant thickness of the slab would be inconveniently small.

The odd ¼ cycle is provided by reason of the fact that $E_3$ and $P_3$ start out ¼ cycle apart at the left or entering face of slab 10', where wave $E_3$ arises lagging $P_3$ by 90°. When the phase difference between $E_3$ and $P_3$ has changed by another ¼ cycle, their relative phase is on the point of shifting into the region where energy will flow from $E_3$ to $P_3$ instead of from $P_3$ to $E_3$, as is desired.

The thickness of the succeeding slabs 10 and 12 is selected so that the difference in phase change undergone by $P_3$ and $E_3$ within each such succeeding slab is equal or substantially equal to $n\pm\frac{1}{2}$ cycles. In this way, $E_3$ is held to a relation with $P_3$, wherein $P_3$, wherein $P_3$ leads $E_3$ by an angle of from 0° to 180°. In FIG. 1, on the assumption that $n=0$ in both of the expressions $n\pm\frac{1}{4}$ and $n\pm\frac{1}{2}$, slab 10' is shown as being half as thick as the slabs 10, while slabs 10 and 12 are shown all of the same thickness. This is not necessary however. $n$ need not be zero, and need not be the same from slab to slab.

$P_3$ and $E_3$ both traverse each slab along the same (generally) oblique path indicated as of length $d$ in FIG. 6, suffering no changes of direction at the internal interfaces. If the difference $\overrightarrow{K_{3P}} - \overrightarrow{K_{3E}}$ between their wave number vectors is written $\Delta K$, the difference in phase change which the two undergo in traversing the slab is $d\Delta K$. If in addition the thickness of the slab is denoted T, $d=T/\cos\theta$, where $\theta$ is the angle between $\overrightarrow{K_{3P}}$ and the normal to the interfaces. The desired condition according to the invention, for the slabs other than the first slab 10', is that $d\Delta K = n\pm\frac{1}{2}$ cycles.

There is evidently a multiple infinity of solutions. The value of $\overrightarrow{K_{3E}}$ is however known from the index of refraction of the material at $f_1+f_2$. While $\overrightarrow{K_{3P}}$, $d$ and $\theta$ cannot be selected independently of each other, it is readily possible to arrive at a solution by a process of successive approximations, for example.

The refracted waves $E_1$ and $E_2$ are rectilinearly propagated though the entire mass 8, the interfaces between adjacent slabs 8 and 10 having no effect on them. The same is true of the fundamental frequency components of the polarizations produced by $E_1$ and $E_2$, of which no prior mention has been made, and also of $E_3$, to all of which the entire mass 8 is isotropic.

$P_3$ is also rectilinearly propagated through the entire mass. At each interface however its phase is changed by 180°. Hence the phase relation between $P_3$ and $E_3$ is always (assuming $n=0$) that which accompanies transfer of energy from $P_3$ to $E_3$. In any slabs for which $n\neq 0$, there will nevertheless be a net transfer from $P_3$ to $E_3$.

The thicknesses of the slabs need not of course be exactly those required to satisfy the relation $d\Delta K = n\pm\frac{1}{2}$ cycles. All that is desired is that in each slab there shall be some net transfer of energy from $P_3$ to $E_2$. To insure that this is achieved however, tolerances on the thicknesses of the slabs must be computed rather as tolerances on the position of each interface reckoned from the first interface, i.e., from the lefthand face of the first slab 10.

Another embodiment of the invention is illustrated in FIG. 2. The embodiment of FIG. 1 employs throughout the dielectric mass material which is optically non-linear so that there is everywhere present a third frequency component of polarization which effects interchange of energy with the third frequency E.M. wave. In the embodiment of FIG. 2, this restriction is abandoned in favor of what is perhaps a simpler structure, the intercalated slabs serving simply for correction of the relative phase of the $P_3$ and $E_3$ waves.

In FIG. 2, the lasers 2 and 4 may be the same as those of FIG. 1. The dielectric mass, generally indicated at 16, here comprises alternate plane-parallel plate slabs 18 of optically non-linear (but not necessarily N.C.S.) material and slabs 20 which may be either without non-linearity or of a non-linearity different from that of slabs 18, with a first slab 18' advantageously of half the thickness but of the same material as slabs 18. Thus the slabs 18 and 18' may be made of ammonium dihydrogen phosphate or of ZnS while the slabs 20 may be made of glass.

The embodiment of FIG. 2 may be used even when the non-linear dielectric of which slabs 18 and 18' are made is of a centro-symmetric type. In this case the E.M. wave at the second harmonic or sum or difference frequency will be generated by an interaction of the quadrupolar type, which is generally weaker than the dipolar interaction in N.C.S. materials.

For generation of third harmonics or combination frequencies of three incident waves, centro-symmetric crystals can also be used in the embodiment of FIG. 2, operative by the dipolar type of interaction.

The slabs 18 and 18' may be dimensioned in thickness in accordance with the criteria already explained in connection with FIGS. 1 and 6. The slabs 20 are dimensioned, in view of their different indices of refraction for the E.M. waves $E_1$, $E_2$ and $F_3$ which are different from the corresponding indices of slabs 18 and 18' and in view of the consequent differences in their wave number vectors for $E_1$, $E_2$ and the sum thereof, as required to restore the relative phase of $E_3$ and $P_3$ at the entrance to the first slab 18 to that portion of the cycle of relative phases between $P_3$ and $E_3$ wherein energy is transferred from $P_3$ to $E_3$ and not in the opposite direction. The first slab 20 should thus have such a thickness that the E.M. wave $E_3$ which was generated in the slab 18' bounding the mass 16 on the left will enter the first slab 18 at that phase, with respect to the phases thereof $F_1$ and $E_2$, as to be, upon entering the first slab 18, lagging the wave $P_3$ generated by $E_1$ and $E_2$ in that first slab 18. The amount of lag is preferably made either 0° or 180° as required in view of the relative length of the wave number vectors $\overrightarrow{K_{3P}}$ and $\overrightarrow{K_{3E}}$ so that the relative phase of $F_3$ and $P_3$ may change by half a cycle within the first slab 18 before $E_3$ begins to lead $P_3$. Slab 18' may be dimensioned in accordance with the criteria discussed for the slab 10' in FIG. 1.

A third embodiment of the invention is illustrated in FIG. 3. In this embodiment, the complete path of the waves over which energy is transferred from the frequencies $f_1$ and $f_2$ to the third frequency lies within a homogeneous mass of non-linear dielectric, which must be N.C.S.

The mass, indicated at 22, may have the shape of a plane parallel plate with entering and emergent faces 24 and 26, and plane parallel reflecting faces 28 and 30. The faces 24 and 30 may or may not be parallel, and similarly for 26 and 28, but preferably the point of entry of the two beams $E_1$ and $F_2$ on face 24 should be near the median plane of the plane parallel plate, as shown in the figure for the face 24 (i.e., approximately half way between the planes of faces 28 and 30).

The embodiment of FIG. 3 is similar to that of FIGS. 1 and 2 in that there is applied repetitively a correction to the relative phase of the third frequency polarization wave $P_3$ and the third frequency E.M. wave $E_3$. By means of this correction a net increase in energy of the $E_3$ wave is achieved between each pair of successive corrections.

Essentially, it is desired that the path $d'$ of the waves $P_3$ and $E_3$ between entry of beams $E_1$ and $E_2$ at face 24 and the first internal reflection at face 30 possess such a length that the difference in phase change undergone by waves $P_3$ and $E_3$ over this path shall be approximately an odd number of quarter cycles.

The correction is obtained by phase change on reflection of the collinear $P_3$ and $E_3$ waves at the parallel faces 28 and 30.

For the dimensioning of the mass 22 in respect of the length $d$ of the path of $E_3$ and $P_3$ between successive reflections at the faces 28 and 30 there applies essentially the same analysis as that above considered in connection with FIGS. 1 and 6. The wave number vector $\overrightarrow{K_{3P}}$, which has here exactly the same significance and the same origin as in the case of FIGS. 1 and 6, defines upon entry of $E_1$ and $E_2$ at face 24 a path for the wave $P_3$ and consequently for the wave $E_3$ to which wave $P_3$ gives rise.

This path has, at each of its reflections at the faces 28 and 30, equal angles $\theta$ of incidence and reflection, and the path is made up of one or (usually) for than one pass $d$ between the faces 28 and 30. If T is the thickness of the body 22 between faces 28 and 30, $T=d \cos \theta$. As in FIG. 1, it is desired that $d\Delta K=n\pm\frac{1}{2}$ cycles with $\Delta K$ having the same significance as before.

The considerations bearing on the choice of $n$ are already mentioned in connection with FIGS. 1 and 6. If for example $n=0$, the interrelation of $\Delta K$, $\theta$ and T is that $\cos \theta=2T\Delta K$. Selection of a combination of the inclinations of the faces 24 and 26 to the faces 28 and 30, of the angles of incidence of the laser beams on face 24 and of the thickness T to provide a convenient solution to the equation $\cos \theta=2T\Delta K$ is a problem in optical engineering thought not to require further discussion here. It may be mentioned however, that it may be desirable to keep small the angles between the beams $E_1$ and $E_2$ as they are incident on face 24 in order that they both may illuminate the same volume of material in body 22 over a long path.

The embodiment of FIG. 3 is operative for the reason that, while $E_1$, $E_2$ and $E_3$ all suffer a 180° phase shift upon each internal reflection at the faces 28 and 30, the wave $P_3$ does not. The sign of the amplitude of $P_3$ being dependent on the product of the signs of $E_1$ and $E_2$ (or, more exactly, of their fundamental frequency polarization waves $P_1$ and $P_2$ which are in phase therewith respectively), change in sign on each of $E_1$ and $E_2$ leaves $P_3$ unchanged in sign, i.e., unchanged in phase. The desired 180° shift in relative phase of $E_3$ and $P_3$ is thus achieved at the end of each path length $d$.

A fourth embodiment of the invention is illustrated in FIG. 4. In FIG. 4, two lasers 2 and 4 are shown illuminating with beams of light $E_1$ and $E_2$ a body 40 of optically nonlinear material, seen in fragmentary plan in FIG. 4. The body 40 may be made of any of the materials hereinabove mentioned as possessing the desired properties for practice of the invention. The material may be either centro-symmetric (C.S.) or non-centro-symmetric (N.C.S.). The opposite faces 41 and 43 of the body 40 are constructed as dichroic mirrors 44 and 46 by the application thereto of a plurality of layers of material of alternating high and low index of refraction for energy of the third frequency, as to which the layers are one half wave length thick. The waves $E_1$ and $E_2$ pass to a large extent unreflected through the dichroic mirror layers, through the body 40 once, and out the other side. In traversing the body they give rise to a component $P_3$ of polarization at the third frequency, and thus the wave $P_3$ develops an E.M. wave $E_3$ also at the third frequency. Light of the third frequency is however substantially reflected by the mirrors 44 and 46. The thickness T of the body 40 is made such that, in conjunction with the angles of incidence of the laser beams on the body, for the wave $E_3$, the total phase change in a round trip from any plane parallel to and between the mirrors back to that plane with reflection at both mirrors is equal to an integral number of cycles. This is in fact the condition that the body 40 with its mirrors be resonant at the third frequency, and in order for it to resonate the radiation at the third frequency must pass substantially perpendicularly between the two mirrors.

The thickness T is further so adjusted that the difference $d\Delta K$ between the phase changes undergone by the third frequency polarization wave $P_3$ and the wave $E_3$ in traversing the body once from the entering side at 44 to the emergent side at 46 is equal to $n\pm\frac{1}{2}$ cycles. Fulfillment of this condition insures that the wave $E_3$ gains in amplitude on each transit from 44 to 46. In returning from 46 to 44, $E_3$ is so mismatched in phase velocity to $P_3$ that there is no interaction between the two.

A fifth embodiment of the invention is illustrated in FIG. 5. Here a body 50 of optically dense linear material is bounded at plane parallel surfaces by bodies 52 and 54 of optically less dense non-linear material. The body 50 may for example be composed of carbon disulphide in liquid form, while the bodies 52 and 54 may be composed of ammonium dihydrogen phosphate (A.D.P.), or potassium dihydrogen phosphate (K.D.P.). Optically linear entrance and exit windows are shown at 56 and 58. The operation of the embodiment of FIG. 5 will be described in terms of doubling of the frequency of a single laser 2 which develops a beam $E_1$ of frequency $f_1$. This beam is totally reflected successively at the bodies 52 and 54, with slight penetration into the non-linear material of those bodies at each such reflection. At each such penetration therefore there is generated a double frequency polarization component $P_4$, and a resulting double frequency E.M. wave $E_4$. This wave $E_4$ is generated and radiates into the linear medium 50 as described in Office of Naval Research Contract No. 1866 (16) NR-372-012, Advanced Research Project Agency Contract RPA-SD-88, Technical Report on Light Waves at the Boundary of Non-Linear Media, by N. Bloembergen (the applicant) and P. S. Pershan, May 15, 1962, constituting Technical Report No. 367, Division of Engineering and Applied Physics, Cruft Laboratory, Harvard University, Cambridge, Mass., to be published in the Physical Review.

The condition for build-up of $E_4$ from reflection to reflection is that at each reflection the wave $E_1$ shall arrive for reflection in such phase with respect to the wave $E_4$ from the preceding reflecton that the wave $E_4'$, say, generated by $E_1$ at the new reflecton will reinfornce the wave $E_4$ previously generated, after reflection of the latter at the new reflection. Let $\vec{K_1}$ and $\vec{K_4}$ be the wave number vectors of $E_1$ and $E_4$ in the linear medium. Let T be the effective thickness of the cell between reflections in the bodies 52 and 54, $d$ the oblique path length between such reflections, $\theta$ the angles of incidence and reflection of the paths $d$, and $\Delta\phi_1$, and $\Delta\phi_4$ the phase shifts on reflection for $E_1$ and $E_4$ respectively, in the event that these are not negligible.

It is then desired that $dK_1=m$ and that $$dK_4=2m+l\pm\frac{(2\Delta\phi_1-\Delta\phi_4)}{2\pi}$$

wherein $m$ is an integer and $l$ is an integer, the latter representing the dispersion in index of refraction of the body 50 between the frequencies $f_1$ and $2f_1$.

It then follows that $d(K_4-2K_1)=l$, but $$d=\frac{T}{\cos \theta}$$

and $$K_4=\frac{f_2 n_2}{c}$$

and $$K_0=\frac{f_1 n_1}{c}$$

Hence $$\frac{f_2}{c}(n_2-n_1)=\frac{l \cos \theta}{T}$$

From this relation, with arbitrary choices for (for example) $l$ and T, the value of $\theta$ can be determined.

The embodiment of FIG. 5 might take the form of a fiber of glass coated with an optically non-linear material, and the fiber may be of round or other cross section.

In respect of frequencies, "optical," "light" and related terms as used herein denote but are not limited to the frequencies of the infra-red, visible and ultra-violet ranges of E.M. radiation. More generally, invention is applicable whenever the wave lengths of the incident and third frequency waves in the non-linear dielectric are small compared to the path lengths in that dielectric, for example the path $d$ in any of the embodiments which have been described hereinabove.

Insofar as N.C.S. materials are employed in the practice of the invention, as for example in FIG. 1, the materials may be either naturally of N.C.S. type or may be rendered so by the application of an electric field. Thus the embodiment of FIG. 1 might employ for the mass 8 an integral body of C.S. non-linear dielectric, with a succession of pairs of electrodes applied to the upper and lower faces thereof (in the figure) and with potential differences of opposite sign between the electrodes of the successive pairs. In general, for the purposes of the invention, electrically induced non-centro-symmetry is equivalent to natural non-centro-symmetry.

The invention has been described herein in terms of a number of preferred embodiments. It is however not limited thereto. The scope of the invention is rather set forth in the appended claims. For example, FIGS. 1 and 2 include initial slabs 10' and 18' of non-linear dielectric having a thickness such that the difference in phase change therethrough of the $P_3$ and $E_3$ waves is an odd number of quarter cycles. This description has been made on the assumption that no wave of frequency $f_3$ was initially available. In applications of the invention as amplifiers instead of oscillators, as for example in providing a parametric converter, whether upwards or downwards in frequency, such initial non-linear slabs are not necessary.

I claim:

1. Apparatus for generating an electromagnetic wave $E_3$ of a frequency $f_3$ from a plurality of electromagnetic waves $E_1$, $E_2$, ... of frequencies $f_1$, $f_2$, ... which frequencies $f_1$, $f_2$, ... may be equal, and which frequency $f_3$ is a linear combination of the frequencies $f_1$, $f_2$, ... said apparatus comprising a body of non-linear dielectric material, a plurality of light sources of frequencies $f_1$, $f_2$, ... respectively, said sources being positioned to illuminate a common region of said body, said sources being of sufficient intensity to generate in the body polarizations varying non-linearly with their intensities, said sources giving rise in said region to a polarization wave of the frequency $f_3$ and having a wave number vector which is a linear combination of the wave number vectors of the electromagnetic waves in said region from said sources, said body having a plurality of boundaries encountered by said polarization wave, said boundaries successively encountered by said polarization wave being separated by path lengths for said polarization wave over which the difference between the phase change undergone by said polarization wave and the electromagnetic wave of frequency $f_3$ whose wave number vector is collinear with that of said polarization wave amounts to substantially $n \pm \frac{1}{2}$ cycles, $n$ being an integer.

2. Apparatus for doubling the frequency of a light beam comprising an optical maser adapted to develop an intense coherent monochromatic beam of light of $f_1$ frequency, a body of non-centro-symmetric dielectric material having at $f_1$ a high dielectric constant and a magnetic susceptibility approaching that of free space, the dielectric constant of said body being a non-linear function of the intensity of incident electromagnetic radiation and including components in higher powers of that intensity, whereby upon illumination of said body by an electromagnetic wave $E_1$ of frequency $f_1$ there is developed in the body a polarization wave $P_3$ of frequency $2f_1$, said body being disposed in position to be illuminated by said maser, and means to shift by substantially 180° the relative phase of $P_3$ and the electromagnetic wave $E_3$ of frequency $2f$; developed within said body by $P_3$ at points in the path of the waves $P_3$ and $E_3$ where in said body the difference in phase change undergone thereby is substantially $n \pm \frac{1}{2}$ cycles, $n$ being an integer.

3. Apparatus for generating an electromagnetic wave $E_3$ of frequency $f_3$ from electromagnetic waves of frequencies $f_1$ and $f_2$, which may be equal, $f_3$ being a linear combination of $f_1$ and $f_2$, said apparatus comprising a plurality of slabs of non-centro-symmetric optically non-linear dielectric material having substantial transparency and optical isotropy to electromagnetic waves of frequencies $f_1$, $f_2$ and $f_3$, adjacent of said slabs being in respect of crystal symmetry the inversion images of each other, at least one high intensity source of light beam $E_1$ of frequency $f_1$ disposed in position to illuminate a common region of said slabs in directions transverse to the long dimension of said slabs, each of said sources having an intensity sufficient to generate in said body a polarization wave including a component varying according to a power of said intensity higher than the first power, the said beam undergoing refraction on entry into said material into a beam identified as to direction and wave number by a wave number vector $\overline{K_{1E}}$, said refracted beam giving rise in said material to a polarization wave $P_3$ at frequency $f_3$ and identified as to direction and wave number by a wave number vector $\overline{K_{3P}}$, the first of said slabs having in the direction of $\overline{K_{3P}}$ such thickness that the difference in phase change undergone in traversal of that first slab by the wave $P_3$ and by the electromagnetic wave $E_3$ generated thereby is substantially $n \pm \frac{1}{4}$ cycles and the remainder of said slabs having in that direction such thickness that the difference in said phase change undergone therein is substantially $n \pm \frac{1}{2}$ cycles, $n$ being an integer which may be zero and which may vary from slab to slab.

4. Apparatus for generating an electromagnetic wave $E_3$ of frequency $f_3$ from electromagnetic waves of frequencies $f_1$ and $f_2$, said apparatus comprising a plurality of plane parallel slabs of non-centro-symmetric dielectric material of cubic crystal lattice having substantial transparency and optical isotropy to electromagnetic waves of frequencies $f_1$, $f_2$ and $f_3$, adjacent of said slabs being in respect of crystal symmetry the inversion images of each other, being in optical contact with each other, and having their crystallographic axes substantially parallel, the electric polarizability of said material including terms in the second or higher powers of the amplitude of the electric vector of electromagnetic waves passing therethrough, separate high intensity sources of light beams $E_1$ and $E_2$ of frequencies $f_1$ and $f_2$, said beams $E_1$ and $E_2$ being of sufficient intensity to generate in said slabs polarization waves including at least one of said terms, said sources being disposed in position to illuminate a common region of said slabs in directions transverse to the plane parallel faces thereof, the said beams undergoing refraction on entry into said material into beams identified as to direction and wave number by wave number vectors $\overline{K_{1E}}$ and $\overline{K_{2E}}$ respectively, said refracted beams giving rise in said material to a polarization wave $P_3$ at frequency $f_3$ and identified as to direction and wave number by a wave number vector $\overline{K_{3P}}$ derived by combination of the vectors $\overline{K_{1E}}$ and $\overline{K_{2E}}$, said slabs having such thickness that in the direction of propagation therethrough of the polarization wave $P_3$ the product $d\Delta K$ of the path length $d$ along that direction in each slab and the difference $\Delta K$ between the wave number vector $\overline{KK_{3P}}$ and the wave number vector $\overline{K_{3E}}$ of an electromagnetic wave $E_3$ of frequency $f_3$ parallel to the wave $P_3$ is substantially equal to $n \pm \frac{1}{4}$ cycles for the first slab and $n \pm \frac{1}{2}$ cycles for the other slabs, $n$ being an integer which may be zero and which may vary from slab to slab and $d$ being variable from slab to slab.

5. Apparatus for generating an electromagnetic wave $E_3$ of frequency $f_3$ from electromagnetic waves of frequencies $f_1$ and $f_2$, said apparatus comprising a succession of first slabs of optically non-linear dielectric material having substantial transparency and optical isotropy to electromagnetic waves of frequencies $f_1$, $f_2$ and $f_3$, adjacent of said first slabs being separated by second slabs of dielectric material of optical linearity different from that of said first slabs, separate high intensity sources of light beams $E_1$ and $E_2$ of frequencies $f_1$ and $f_2$ disposed in position to illuminate a common region of said slabs in directions transverse to the plane parallel faces thereof, said beams being of sufficient intensity to generate in said first slabs polarization waves including at least one term varying with a power of the intensity of said beams higher than the first power, the said beams undergoing refraction on entry into the material of said first slabs into beams identified as to direction and wave number by wave number vectors $K_{1E}$ and $K_{2E}$ respectively, said refracted beams giving rise in said material to a polarization wave $P_3$ at frequency $f_3$ and identified as to direction and wave number by a wave number vector $K_{3P}$ derived by combination of the vectors $K_{1E}$ and $K_{2E}$, the first of said first slabs having in the direction of $K_{3P}$ such thickness that the difference in phase change undergone in traversal of that first slab by the wave $P_3$ and by the electromagnetic wave $E_3$ generated thereby is substantially $n \pm \frac{1}{4}$ cycles and the remainder of said first slabs having in that direction such thickness that the difference in said phase change undergone therein is substantially $n \pm \frac{1}{2}$ cycles, $n$ being an integer which may be zero and which may vary from slab to slab, the thickness of said second slabs being such as to impose on the wave $E_3$ a phase lagging the phase of the wave $P_3$ upon emerging from said second slabs individually.

6. Apparatus for generating an electromagnetic wave $E_3$ of frequency $f_3$ from electromagnetic waves of frequencies $f_1$ and $f_2$, said apparatus comprising a body of optically non-linear non-centro-symmetric dielectric material having opposed smooth faces at which total internal reflection may take place, separate high intensity sources of light beams $E_1$ and $E_2$ of frequencies $f_1$ and $f_2$ incident on a common region of said body at inclinations such as to enter said body and give rise therein to refracted beams identified as to direction and wave number by wave number vectors $K_{1E}$ and $K_{2E}$ respectively, said beams being of intensity sufficient to generate in said body polarization waves including a component varying according to a power of that intensity higher than the first, said refracted beams giving rise in said material to a polarization wave $P_3$ at frequency $f_3$ and identified as to direction and wave number by a wave number vector $\overrightarrow{K_{3P}}$ derived by combination of the vectors $\overrightarrow{K_{1E}}$ and $\overrightarrow{K_{2E}}$, said body being dimensioned to provide for said wave $P_3$ a path $d'$ of such length between entry of beams $E_1$ and $E_2$ therein and the first total internal reflection of wave $P_3$ that the difference in phase change undergone over path $d'$ by the wave $P_3$ and by the electromagnetic wave $E_3$ generated thereby is substantially $n \pm \frac{1}{4}$ cycles, said body being further dimensioned to provide for said wave $P_3$ between successive internal reflections therein paths $d$ over which the said difference in phase change is substantially $n \pm \frac{1}{2}$ cycles, $n$ being an integer which may be zero and which may vary from path to path.

7. Apparatus for generating an electromagnetic wave $E_3$ of frequency $f_3$ from electromagnetic waves of frequencies $f_1$ and $f_2$, said apparatus comprising a body of optically non-linear dielectric material having two plane parallel faces, separate high intensity sources of light beams $E_1$ and $E_2$ of frequencies $f_1$ and $f_2$ incident on a common region of said body transversely of said faces, said beams being of intensity sufficient to generate in said body polarization waves including a component varying according to a power of that intensity higher than the first, and a dichroic mirror on each of said faces having low reflectance to the frequencies $f_1$ and $f_2$ and higher reflectance to the frequency $f_3$ derived as a linear combination of the frequencies $f_1$ and $f_2$, the thickness of said body between said faces being such that for the polarization wave $P_3$ of frequency $f_3$ generated therein by said beams $E_1$ and $E_2$ and for the electromagnetic wave $E_3$ of frequency $f_3$ generated therein by $P_3$, the difference in phase change undergone by $P_3$ and $E_3$ in traversing the body between said faces in direction generally parallel to that of the incident light from said sources is substantially equal to $n \pm \frac{1}{2}$ cycles, $n$ being an integer which may be zero.

8. Apparatus for generating an electromagnetic wave $E_3$ of frequency $2f_1$ from electromagnetic waves of frequency $f_1$, said apparatus comprising a body of optically linear material having two opposite plane parallel faces, separate bodies of optically non-linear material disposed in optical contact with each of said faces, and at least one high intensity source of light of frequency $f_1$ disposed in position to send a beam $E_1$ into said body for successive reflections at said bodies of non-linear material for generating at each such reflection a polarization wave of frequency $2f_1$, said beam being of intensity sufficient to generate in said bodies of non-linear material polarization waves including a component varying according to a power of that intensity higher than the first.

References Cited

Bass et al: "Optical Mixing," Physical Review Letters, vol. 8, No. 1, Jan. 1, 1962, p. 18.

Frauken et al: "Generation of Optical Harmonics," Physical Review Letters, vol. 7, No. 4, Aug. 15, 1961, pp. 119, 120.

Giordmaine: "Mixing of Light Beams In Crystals," Physical Review Letters, vol. 8, No. 1, Jan. 1, 1962, pp. 19, 20.

Maker et al: "Effects of Dispersion and Focusing on the Production of Optical Harmonics," Physical Review Letters, vol. 8, No. 1, Jan. 1, 1962, pp. 21, 22.

JEWELL H. PEDERSEN, *Primary Examiner.*

RONALD L. WIBERT, *Examiner.*